(12) United States Patent
Ha

(10) Patent No.: US 8,717,358 B2
(45) Date of Patent: May 6, 2014

(54) IMAGE PROCESSING APPARATUS AND METHOD

(75) Inventor: In Woo Ha, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 569 days.

(21) Appl. No.: 12/805,454

(22) Filed: Jul. 30, 2010

(65) Prior Publication Data
US 2011/0069068 A1 Mar. 24, 2011

(30) Foreign Application Priority Data
Sep. 21, 2009 (KR) .................. 10-2009-0088983

(51) Int. Cl.
*G06T 15/50* (2011.01)
(52) U.S. Cl.
USPC .......................................................... 345/426
(58) Field of Classification Search
None
See application file for complete search history.

(56) References Cited

U.S. PATENT DOCUMENTS

| | | | |
|---|---|---|---|
| 6,704,025 B1* | 3/2004 | Bastos et al. | 345/589 |
| 2008/0211816 A1* | 9/2008 | Gonzalez et al. | 345/505 |
| 2009/0005139 A1* | 1/2009 | Morimoto | 463/6 |

FOREIGN PATENT DOCUMENTS

| | | |
|---|---|---|
| JP | 2008-234473 | 10/2008 |
| JP | 2009-064085 | 3/2009 |
| JP | 2009-086856 | 4/2009 |
| KR | 10-2002-0089648 | 11/2002 |
| KR | 10-0382366 | 4/2003 |
| KR | 10-2006-0073814 | 6/2006 |

* cited by examiner

*Primary Examiner* — Kee M Tung
*Assistant Examiner* — Frank Chen
(74) *Attorney, Agent, or Firm* — Staas & Halsey LLP

(57) ABSTRACT

Provided is an image processing apparatus and process. The image processing apparatus may perform three-dimensional (3D) rendering by adaptively providing virtual point lights (VPLs). It is possible to adaptively adjust an amount of 3D rendering calculations according to a desired quality, and to provide a real-time rendering result for each calculation process.

35 Claims, 10 Drawing Sheets

IMAGE PROCESSING APPARATUS AND METHOD

CROSS-REFERENCE TO RELATED APPLICATIONS

This application claims the benefit of Korean Patent Application No. 10-2009-0088983, filed on Sep. 21, 2009, in the Korean Intellectual Property Office, the disclosure of which is incorporated herein by reference.

BACKGROUND

1. Field

One or more embodiments relate to real-time rendering with respect to an object included in a three-dimensional (3D) model, and more particularly, to a process and system providing a virtual point light (VPL) on a 3D model during a rendering process using a radiosity scheme.

2. Description of the Related Art

With developments in technologies of hardware and software, people are increasingly interested in real-time rendering for three-dimensional (3D) models in various types of fields such as 3D games, virtual world animations, movies, and the like.

However, a large amount of calculations may be used to perform high quality 3D rendering. Thus, due to the low performance of available hardware, there is a limit on real-time rendering. Accordingly, conventional research has been focused on enhancing the performance of hardware and effectively performing required calculations to decrease the amount of calculations.

In a 3D rendering scheme, a radiosity scheme denotes a scheme of enhancing a rendering quality based on a direct illumination by light existing within a 3D model and an indirect illumination by reflected light that is caused by reflecting the direct illumination from an object, a scattered reflection, and the like.

In this case, a process of locating a virtual point light (VPL) at a particular location within the 3D model to generate a shadow map observed at a viewpoint of the VPL is typically required. When a number of VPLs increases to enhance the rendering quality, an amount of calculations may also increase.

SUMMARY

According to an aspect of one or more embodiments, there may be provided an image processing apparatus including a first calculator to generate a shadow map with respect to each of plural sampling virtual point lights (VPLs) that are provided on a three dimensional (3D) model, at a first viewpoint, a selector to select, from the plurality of sampling VPLs based on the shadow maps of the sampling VPLs, at least one seed VPL that is exposed at a second viewpoint for image rendering, and a second calculator to provide a plurality of super sampling VPLs around the at least one seed VPL at the second viewpoint, and to generate a shadow map with respect to each of the super sampling VPLs.

The image processing apparatus may further include a rendering unit to render an image observed at the second viewpoint, based on a shadow map of the at least one seed VPL and the shadow maps of the super sampling VPLs.

The image processing apparatus may further include a third calculator to provide at least one auxiliary VPL on the 3D model observed at the second viewpoint, and to generate a shadow map with respect to each of the at least one auxiliary VPL.

The rendering unit may render the image observed at the second viewpoint based on the shadow map of the at least one seed VPL, the shadow maps of the super sampling VPLs, and the shadow map of the at least one auxiliary VPL.

The at least one auxiliary VPL may be provided in a portion exposed at the second viewpoint of the object of the 3D model, and in a rear portion of the second viewpoint.

The rendering unit may render the image using a radiosity scheme. The first viewpoint may correspond to a light view location within the 3D model.

According to another aspect of one or more embodiments, there may be provided an image processing apparatus including a first calculator to generate a shadow map with respect to each of plural sampling VPLs that are provided on a 3D model, at a first viewpoint, a rendering unit to render an image observed at a second viewpoint with respect to the 3D model, based on the shadow maps of the sampling VPLs, a selector to select, from the plurality of sampling VPLs, at least one seed VPL that is exposed at the second viewpoint for image rendering, and a second calculator to provide a plurality of super sampling VPLs around the at least one seed VPL at the second viewpoint, and to generate a shadow map with respect to each of the super sampling VPLs.

The rendering unit may update the image based on a shadow map of the at least one seed VPL and the shadow maps of the super sampling VPLs.

The image processing apparatus may further include a third calculator to provide at least one auxiliary VPL on the 3D model observed at the second viewpoint, and to generate a shadow map with respect to each of the at least one auxiliary VPL.

The rendering unit may update the image based on the shadow map of the at least one seed VPL, the shadow maps of the super sampling VPLs, and the shadow map of the at least one auxiliary VPL.

According to still another aspect of one or more embodiments, there may be provided an image processing method, including generating a shadow map with respect to each of plural sampling VPLs that are provided on a 3D model, at a first viewpoint, selecting, from the plurality of sampling VPLs based on the shadow maps of the sampling VPLs, at least one seed VPL that is exposed at a second viewpoint for image rendering, and providing a plurality of super sampling VPLs around the at least one seed VPL at the second viewpoint, to generate a shadow map with respect to each of the super sampling VPLs.

The image processing method may further include rendering an image observed at the second viewpoint, based on a shadow map of the at least one seed VPL and the shadow maps of the super sampling VPLs.

The image processing method may further include providing at least one auxiliary VPL on the 3D model observed at the second viewpoint to generate a shadow map with respect to each of the at least one auxiliary VPL.

The rendering may include rendering the image observed at the second viewpoint based on the shadow map of the at least one seed VPL, the shadow maps of the super sampling VPLs, and the shadow map of the at least one VPL.

According to yet another aspect of one or more embodiments, there may be provided an image processing method including generating a shadow map with respect to each of plural sampling VPLs that are provided on a 3D model, at a first viewpoint, rendering an image observed at a second viewpoint with respect to the 3D model, based on the shadow maps of the plural sampling VPLs, selecting, from the plurality of sampling VPLs, at least one seed VPL that is exposed at the second viewpoint for image rendering, providing a plurality of super sampling VPLs around the at least one seed VPL at the second viewpoint, to generate a shadow map with respect to each of the super sampling VPLs, and updating the image based on a shadow map of the at least one seed VPL and the shadow maps of the super sampling VPLs.

Additional aspects, features, and/or advantages of exemplary embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Figure 1:
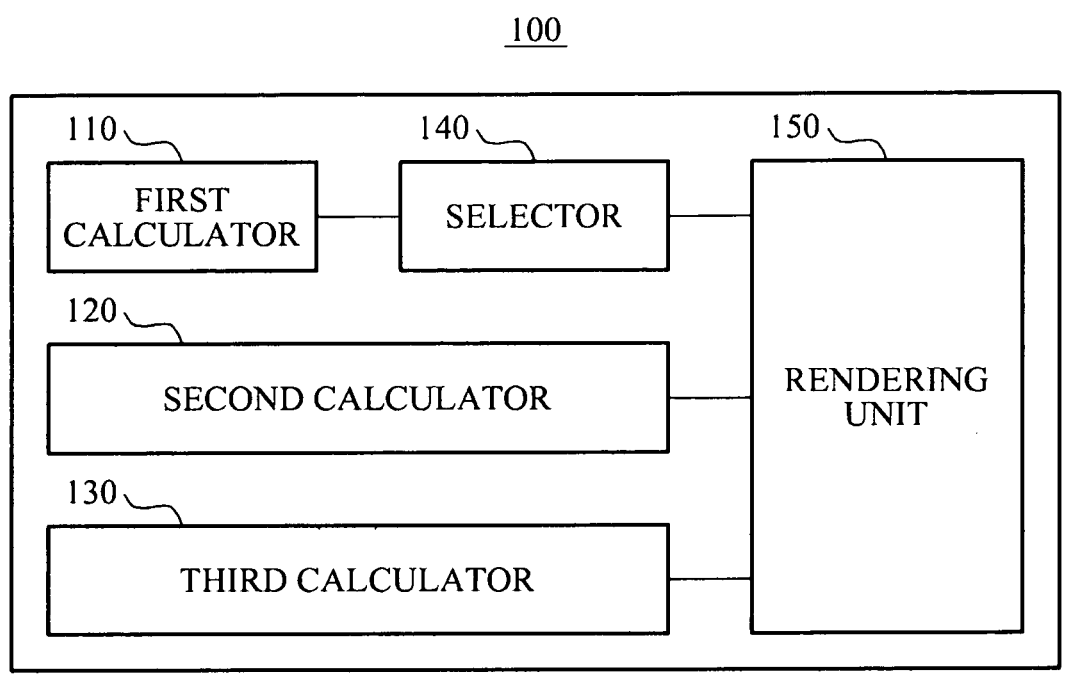
FIG. 1 illustrates an image processing apparatus according to an embodiment.

Reference will now be made in detail to embodiments, examples of which are illustrated in the accompanying drawings, wherein like reference numerals refer to like elements throughout. In this regard, embodiments of the present invention may be embodied in many different forms and should not be construed as being limited to embodiments set forth herein. Accordingly, embodiments are merely described below, by referring to the figures, to explain aspects of the present invention.

FIG. 1 illustrates an image processing apparatus 100 according to an embodiment.

A first calculator 110 may generate a shadow map with respect to each of sampling virtual point lights (VPLs). A relatively small number of sampling VPLs may be provided on an object observed at a light view with respect to a three-dimensional (3D) model. A process of providing the sampling VPLs may be further described with reference to FIG. 6.

A selector 140 may select, from the sampling VPLs, at least one seed VPL that may affect rendering of an image observed at a camera view for image rendering.

When selecting the at least one seed VPL, the selector 140 may utilize a shadow test with respect to the camera view.

A second calculator 120 may generate a shadow map with respect to each of super sampling VPLs that are provided around the at least one seed VPL.

A process of providing the super sampling VPLs and generating the shadow map with respect to each of the super sampling VPLs will be further described with reference to FIG. 7.

In addition to the super sampling VPLs, auxiliary VPLs that may affect rendering of the image observed at the camera view may be additionally provided. A third calculator 130 may generate a shadow map with respect to each of the auxiliary VPLs.

Providing of the auxiliary VPLs and generating of the shadow map with respect to each of the auxiliary VPLs may be performed after providing the super sampling VPLs and calculating the shadow map with respect to each of the super sampling VPLs. However, it is only an example. Operations of the second calculator 120 and the third calculator 130 may be simultaneously performed. Also, the operation of the third calculator 130 may be performed prior to the operation of the second calculator 120. Some operations may be omitted.

A rendering unit 150 may render the image observed at the camera view based on a portion of or all of the shadow map of the at least one VPL, the shadow maps of the super sampling VPLs, and the shadow maps of the auxiliary VPLs.

As described above, the rendering unit 150 may render the image after the operations of the first calculator 110, the second calculator 120, and the third calculator 130 are performed. However, it is only an example. Depending on embodiments, immediately after the operation of the first calculator 110 is performed, the rendering unit 150 may provide an initial rendering result and then results of the second calculator 120 and the third calculator 130 may be obtained. In this case, it is possible to provide an enhanced rendering image by consecutively or non-consecutively updating the initial rendering result.

The operation of the image processing apparatus 100 will be further described with reference to FIGS. 6 through 9.

Figure 2:
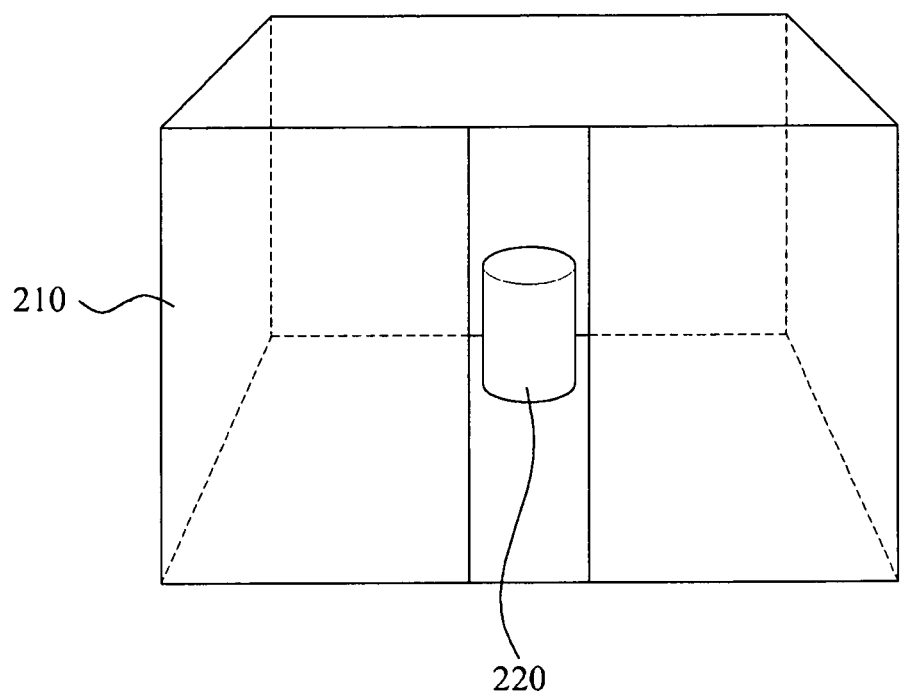
FIG. 2 illustrates an object of a three-dimensional (3D) model rendered using an image processing apparatus and method according to an embodiment.

FIG. 2 illustrates an object of a 3D model 200 rendered using an image processing apparatus and method according to an embodiment.

The 3D model 200 may include an object 210 that represents a room with a partially open front and an object 220 that is provided in a cylindrical form within the room. The 3D model 200 may be an example used for ease of description and thus various types of examples may be applicable.

A view of the 3D model 200 of FIG. 2 is observed at a light view (hereinafter, "first viewpoint") with respect to the 3D model 200.

Here, as only an example, it is assumed that another independent light does not exist within the object 210.

Hereinafter, a camera view (hereinafter, "second viewpoint") 302 for rendering the image and a top view of the 3D model 200 will be described with reference to FIG. 3.

Figure 3:
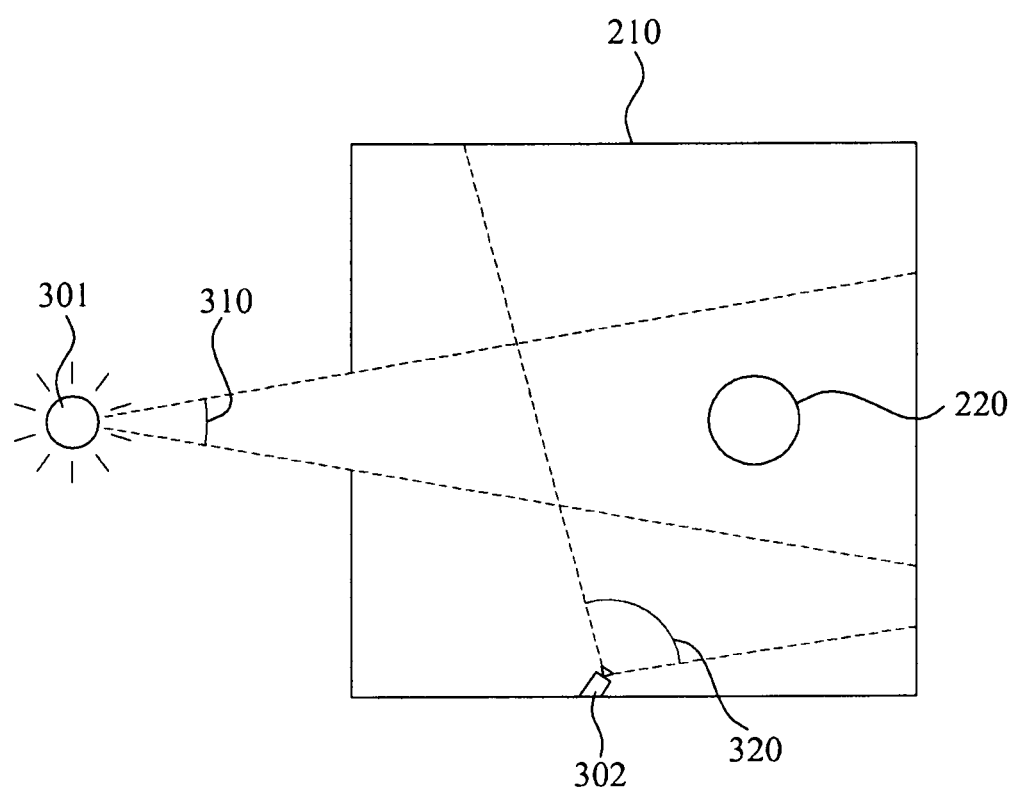
FIG. 3 illustrates a top view of a light source and the object of the 3D model of FIG. 2.

FIG. 3 illustrates a top view of a light source 301 and the objects 210 and 220 of the 3D model 200 of FIG. 2.

The light source 301 that may be considered for rendering of the 3D model 200 may be located outside the object 210 in a form of a hexahedral room to provide light to the inside of the object 210 via a gap of the partially open front of the object 210.

A range of the light of the light source 301 located outside the object 210 that reaches the inside of the object 210 may be expressed using an angle 310. The direct light may not reach a portion outside the angle 310 within the object 210.

An area observed at the second viewpoint 302 for image rendering may be expressed using an angle 320. Hereinafter, a process of calculating a color value of an area within the angle 320 to render an image will be described.

Figure 4:
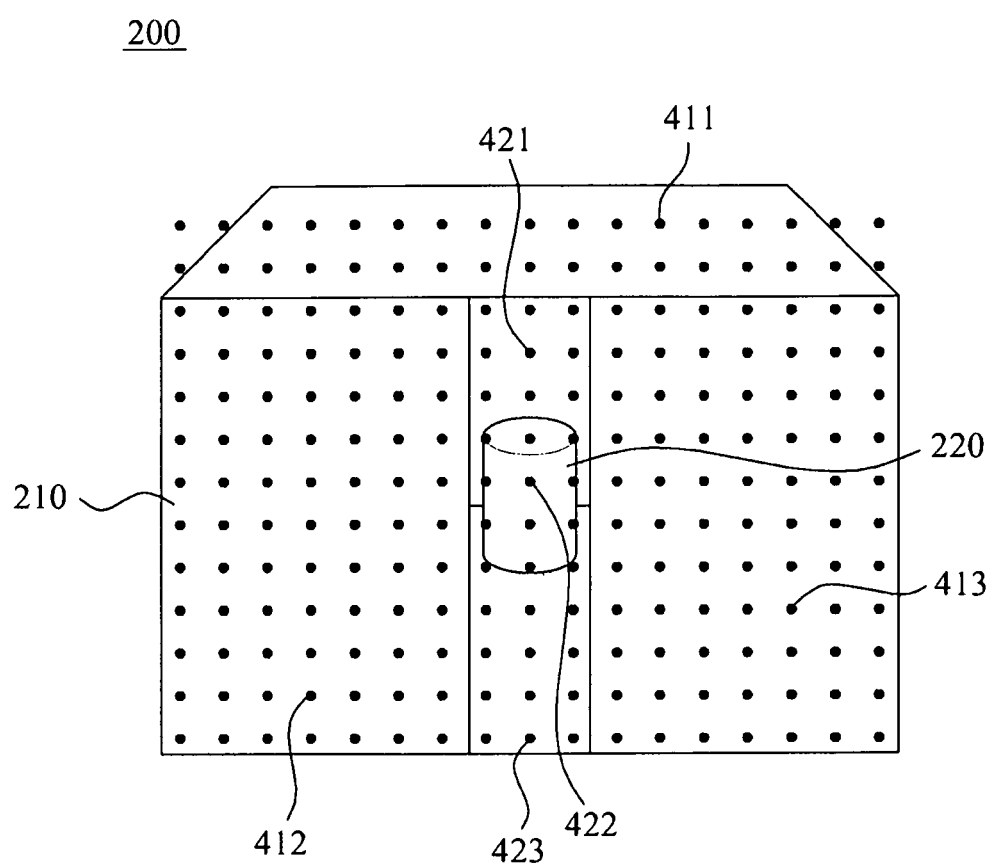
FIG. 4 illustrates a rendering process when virtual point lights (VPLs) are provided at a light view of FIG. 3.

FIG. 4 illustrates a rendering process when VPLs are provided at the first viewpoint of FIG. 3.

A radiosity scheme corresponds to one of 3D rendering schemes, and may provide, on a 3D model, VPLs representing a natural phenomenon such as a light reflection, and may render an image based on a change in an object occurring due to the VPLs.

Generally, when a number of VPLs increases, a rendering quality may also be enhanced. However, since the amount of calculations significantly increases, a rendering rate may decrease.

In FIG. 4, 17×13, that is, a total of 221 VPLs are provided on the 3D model 200 observed at the first viewpoint.

In this case, a process of generating a shadow map with respect to each of the 221 VPLs may be used for rendering.

However, referring to FIG. 3, all the 221 VPLs may not exist within the range corresponding to the angle 320 of the second viewpoint 302 for image rendering.

It can be known from FIG. 4 that only a total of 33 VPLs existing within the illustrated gap of the partially open front formed on the object 210, including VPLs 421, 422, and 423 may affect rendering of the image observed at the second viewpoint 302.

Although the 221 VPLs are provided, a probability may be relatively very low that the remaining 188 VPLs excluding the 33 VPLs from the 221 VPLs, for example, VPLs 411, 412, and 413 may affect rendering of the image observed at the second viewpoint 302.

Accordingly, a shadow map generation with respect to the 188 VPLs may cause an unnecessary waste of resources. Accordingly, VPLs may be adaptively provided to enhance a rendering calculation efficiency.

Figure 5:
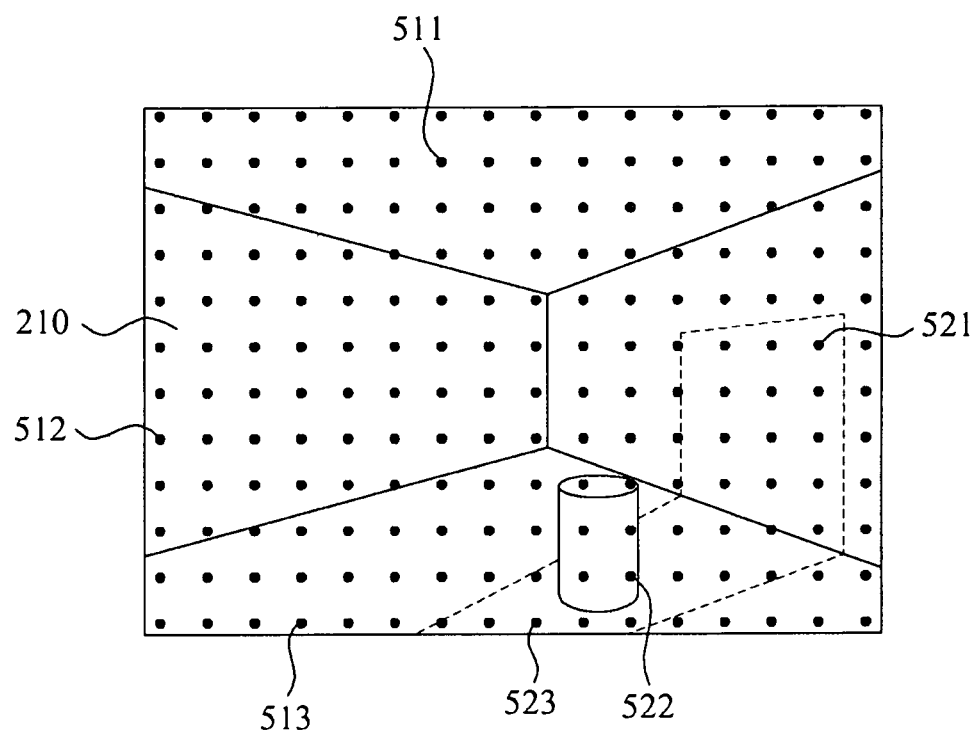
FIG. 5 illustrates a rendering process when VPLs are provided at a camera view of FIG. 3.

FIG. 5 illustrates a rendering process when VPLs are provided at the second viewpoint 302 of FIG. 3.

AD the VPLs are provided at locations to affect the second viewpoint 302. In this example, VPLs 521, 522, and 523 exist within the range corresponding to the angle 310 of the first viewpoint and thus may exist on an object that may generate directly reflected light. Accordingly, the VPLs 521, 522, and 523 correspond to VPLs that may significantly affect a color value in image rendering. In FIG. 5, approximately 31 VPLs may correspond to the above VPLs that may significantly affect the color value.

However, the remaining 161 VPLs excluding the above 31 VPLs from a total of approximately 192 VPLs, for example, VPLs 511, 512, and 513 are located outside the range corresponding to the angle 310 of the first viewpoint and thus may not be reached by the direct illumination.

Accordingly, the 161 VPLs including the VPLs 511, 512, and 513 may represent natural phenomena such as light that is reflected at least twice inside the object 210, or a scattered reflection or a diffraction of light. The above 161 VPLs may help an enhancement of radiosity rendering quality, however, may have a relatively smaller affect on a color value compared to the 31 VPLs.

Specifically, even a scheme of providing the VPLs on a portion affecting the second viewpoint 302 may be ineffective and thus, there is a desire for a scheme of adaptively providing the VPLs.

Figure 6:
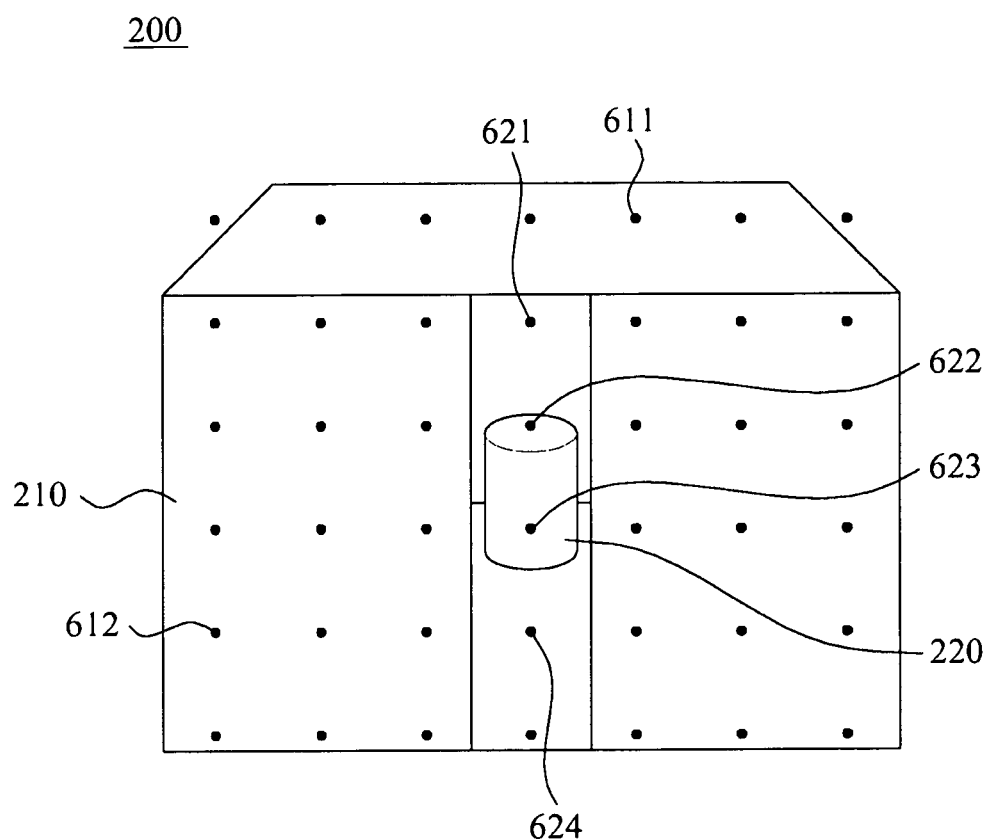
FIG. 6 illustrates a diagram of providing sampling VPLs at the light view of FIG. 3.

FIG. 6 illustrates a diagram of providing sampling VPLs at the first viewpoint of FIG. 3.

A significantly smaller number of sampling VPLs than the number of sampling VPLs of FIG. 3 may be provided on the objects 210 and 220 of the 3D model 200 observed at the first viewpoint. The significantly smaller number of sampling VPLs may be provided based on that only a portion of VPLs provided on the objects 210 and 220 observed at the first viewpoint may be used to calculate a color value of the rendering image observed at the second viewpoint 302, which is described above with reference to FIG. 3.

In FIG. 6, a total of 42 sampling VPLs are provided.

The first calculator 110 may generate a shadow map with respect to each of the 42 sampling VPLs. A shadow test performed at the second viewpoint 302 using the generated shadow maps may be used to determine whether each of the sampling VPLs contributes to rendering of the image observed at the second viewpoint 302, and a contribution level.

By using the following Equation 1, it is possible to estimate whether each of the sampling VPLs contributes to rendering of the image observed at the second viewpoint 302 without generating a shadow map with respect to each of the sampling VPLs, and a contribution level. In the following Equation 1, when a weight is zero or becomes closer to zero, a corresponding VPL may be determined to not contribute to the rendering of the image.

$$\text{Weight} = c1 * \text{VPL intensity} * \{\max(0, \text{dot}(LSN, SD)) \\ * \max(0, \text{dot}(CSN, -SD))\} / |SD \text{ distance}|^n \quad \text{Equation 1}$$

Here, c1 denotes a constant, the VPL intensity denotes an intensity of a sampling VPL, LSN denotes a normal direction vector of an object surface portion observed at the first viewpoint, CSN denotes a normal direction vector of an object surface portion observed at the second viewpoint 302, SD denotes a direction vector of the straight line that connects the object surface portion observed at the first viewpoint and the object surface portion observed at the second viewpoint 302, that is, a direction vector of the straight line starting from the object surface portion observed at the first viewpoint towards the object surface portion observed at the second viewpoint 302, and $|SD \text{ distance}|^n$ denotes n-th power with respect to a distance of an SD vector on a 3D space.

The object surface portion observed at the first viewpoint and the object surface portion observed at the second viewpoint 302 may be actually extracted from an image rendered at the first viewpoint and the second viewpoint 302. To perform the above test with respect to all the combinations of pixels constituting the corresponding image may be ineffective. Accordingly, the above test may be performed based on a group unit by grouping the pixels based on a predetermined size.

Instead of performing a validity test with respect to each of VPLs extracted at an actual sampling result, the above test result may be reflected in an image that expresses an importance probability distribution referred to as an importance map prior to sampling. A probability-based VPL sampling may be performed based on the importance map with the reflected result.

For example, using the shadow test, five sampling VPLs including sampling VPLs 621, 622, 623, and 624 provided on the inside object 210 disposed in the front gap of the object 210 may be determined to contribute to rendering of the image observed at the second viewpoint 302. Hereinafter, the five sampling VPLs are referred to as seed VPLs.

The remaining 37 sampling VPLs including sampling VPLs 611 and 612 may be determined to not contribute to rendering of the image observed at the second viewpoint 302.

Through the above process, it is possible to prevent unnecessary sampling VPLs from being provided and thereby significantly reduce calculation inefficiency.

Figure 7:
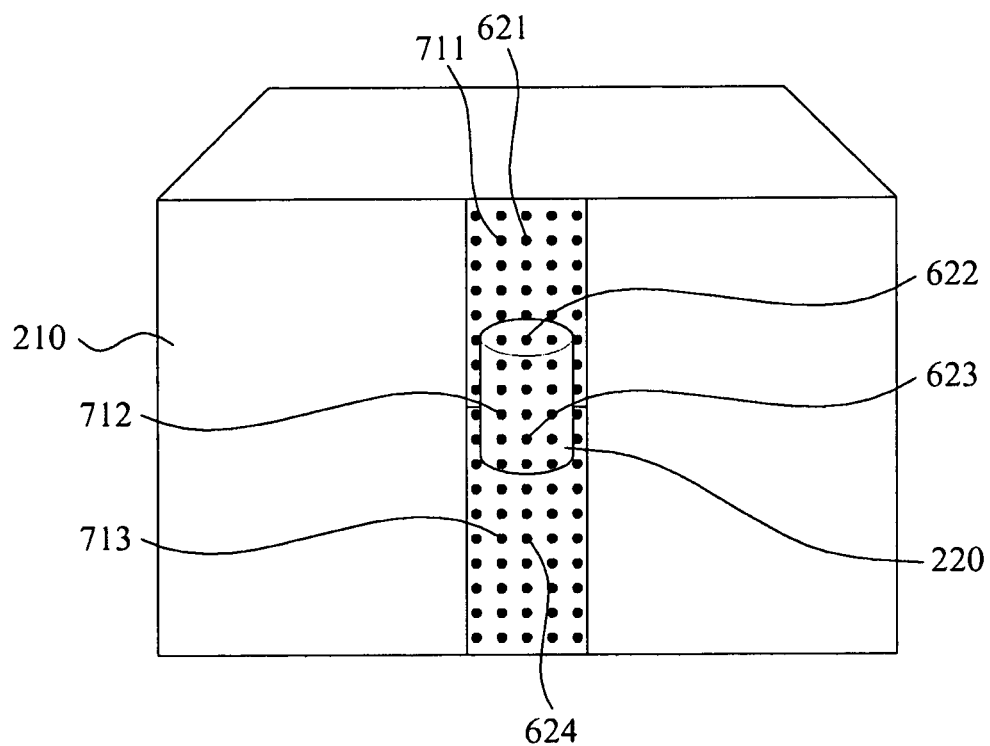
FIG. 7 illustrates a diagram of providing super sampling VPLs around at least one seed VPL selected from the sampling VPLs of FIG. 6.

FIG. 7 illustrates a diagram of providing super sampling VPLs around at least one seed VPL selected from the sampling VPLs of FIG. 6.

The super sampling VPLs including super sampling VPLs 711, 712, and 713 are additionally provided around the seed VPLs including the seed VPLs 621, 622, 623, and 624. Since the super sampling VPLs may be provided appearing as though the super sampling VPLs are spread to be around the seed VPLs, the term "seed VPL" is used.

Through the above process, it is possible to provide a relatively large number of VPLs that are located at a location to affect rendering of the image observed at the second viewpoint 302, and also receive the direct illumination within the angle 310 of the light source 301.

The second calculator 120 may generate a shadow map with respect to each of the super sampling VPLs.

Figure 8:
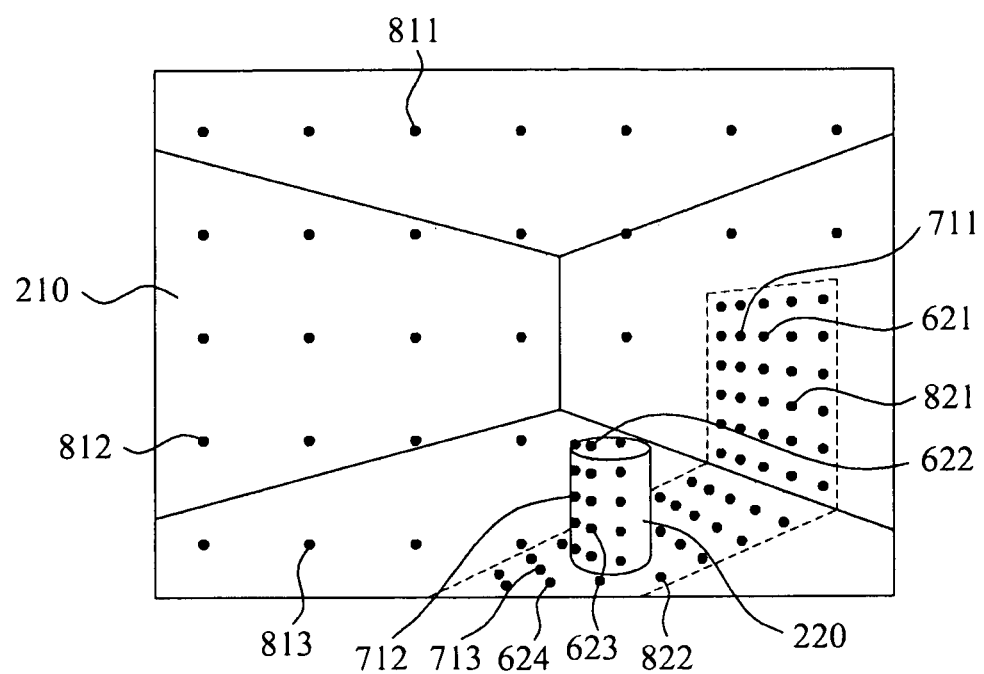
FIG. 8 illustrates a diagram of providing the super sampling VPLs of FIG. 7 and additional auxiliary VPLs.

FIG. 8 illustrates a diagram of providing the super sampling VPLs of FIG. 7 and additional auxiliary VPLs.

In addition to the seed VPLs 621, 622, 623, and 624, and the super sampling VPLs including the super sampling VPLs 711, 712, 713, 821, and 822, other VPLs representing a natural phenomena may be provided to enhance a quality of radiosity rendering. The natural phenomena may be, for example, light reflected at least twice, a scattered reflection, diffraction, and the like.

The other VPLs described above may be referred to as "auxiliary VPLs", for example, VPLs 811 and 812 of FIG. 8. There may be no need to provide a large number of auxiliary VPLs. It may be sufficient to provide a relatively small number of auxiliary VPLs.

The third calculator 130 may generate a shadow map with respect to each of the auxiliary VPLs.

Figure 9:
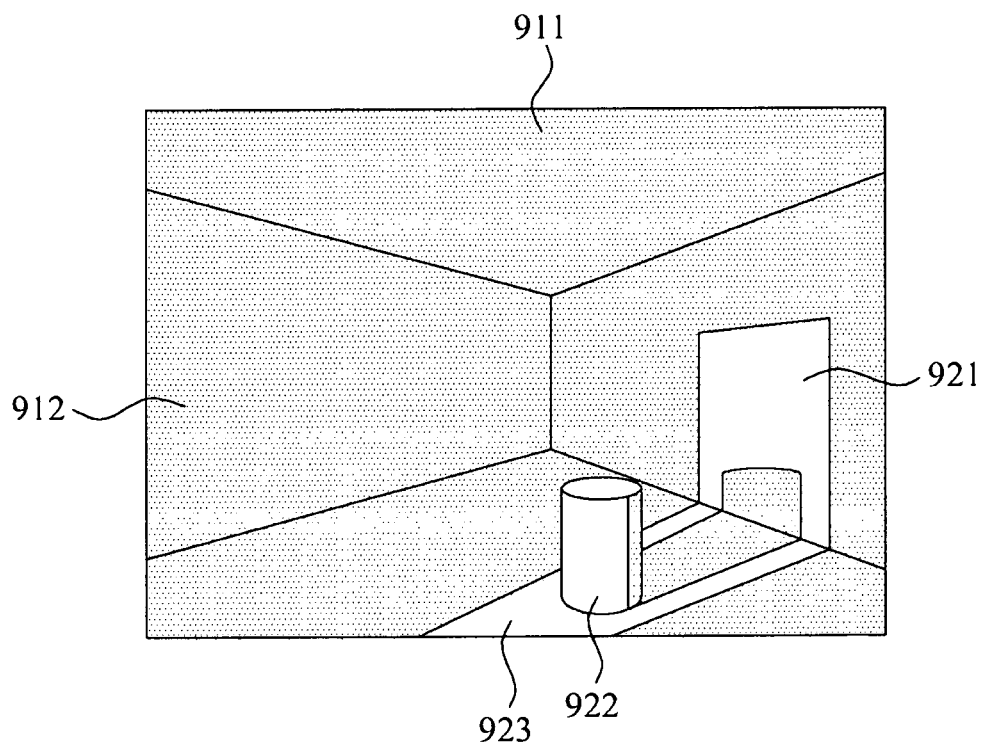
FIG. 9 illustrates a result of rendering the 3D model observed at a camera view of FIG. 3 based on the VPLs of FIG. 8.

FIG. 9 illustrates a result of rendering the 3D model 200 observed at the second viewpoint 302 of FIG. 3 based on the VPLs of FIG. 8.

The rendering unit 150 may render the image observed at the second viewpoint 302 based on shadow maps of the seed VPLs, shadow maps of the super sampling VPLs, and shadow maps of the auxiliary VPLs. A color value may be calculated using a general radiosity scheme.

In a rendering result image 900, a color value may exist even in object portions including portions 911 and 912 where the direct illumination does not reach, and a soft shadow may be generated in a boundary region between object portions including portions 921, 922, and 923 where the direct illumination reaches.

In an embodiment, the rendering process described above with reference to FIGS. 4 through 9 may perform rendering and then generate a corresponding image after all the operations of i) providing sampling VPLs and generating a shadow map with respect to each of the sampling VPLs, ii) selecting at least one seed VPL from the sampling VPLs, iii) providing super sampling VPLs and generating a shadow map with respect to each of the super sampling VPLs, and iv) providing auxiliary VPLs and generating a shadow map with respect to each of the auxiliary VPLs. However, this is only an example and thus various types of embodiments may be applicable.

For example, after the operations of i) providing the sampling VPLs and generating the shadow map with respect to each of the sampling VPLs are performed, an initial rendering image may be provided by the rendering unit 150. In this instance, the rendering quality may be deteriorated compared to the quality of rendering performed after the above operations i) through iv). However, when an intermediate rendering result is desired to be provided before all the calculation processes are terminated, the above example may be applicable.

For example, the above example may be applicable to a real-time calculation of 3D game image rendering that uses fast frame switching.

In this example, for each of the processes ii) through iv), the rendering unit 150 may provide the intermediate rendering result to thereby update a previous rendering image.

Figure 10:
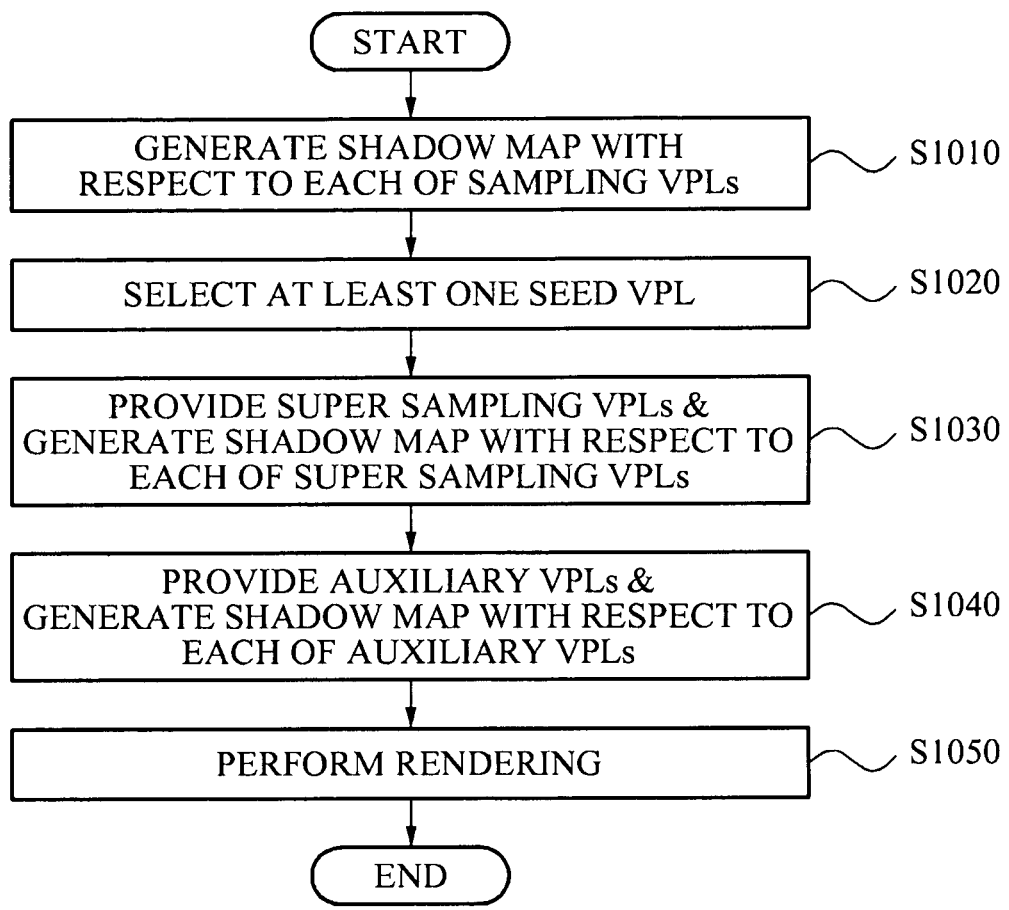
FIG. 10 illustrates an image processing method according to an embodiment.

FIG. 10 illustrates an image processing method according to an embodiment.

In operation S1010, a shadow map may be generated with respect to each of sampling VPLs. A relatively small number of sampling VPLs may be provided on an object observed with respect to a 3D model. Descriptions related thereto are made above with reference to FIG. 6 and thus further descriptions will be omitted here.

In operation S1020, at least one seed VPL affecting rendering of an image observed at a second viewpoint may be selected from the sampling VPLs.

The at least one seed VPL may be selected using a shadow test with respect the second viewpoint.

In operation S1030, a plurality of super sampling VPLs may be provided around the at least one seed VPL, and a shadow map may be generated with respect to each of the super sampling VPLs. Descriptions related thereto are made above with reference to FIG. 7 and thus further descriptions will be omitted here.

In operation S1040, in addition to the super sampling VPLs, auxiliary VPLs that may affect rendering of the image observed at the second viewpoint may be additionally provided, and a shadow map may be generated with respect to each of the auxiliary VPLs.

It is described above that operation S1030 is followed by operation S1040. However, depending on embodiments, operations S1030 and S1040 may be simultaneously performed, or operation S1030 may follow operation S1040. Some operations may be omitted.

In operation S1050, the image observed at the second viewpoint may be rendered using a portion of or all of the shadow map of the at least one seed VPL, the shadow maps of the super sampling VPLs, and the shadow maps of the auxiliary VPLs.

The above rendering process may be performed using a general radiosity scheme.

As described above, the image rendering may be performed in operation S1050. Depending on embodiments, the image rendering may be performed consecutively or inconsecutively during the operations S1010 through S1040.

The image processing method according to the above-described exemplary embodiments may be recorded in computer-readable media including program instructions to implement various operations embodied by at least one processing device, such as a processor or computer, for example. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter.

While aspects of the present invention has been particularly shown and described with reference to differing embodiments thereof, it should be understood that these embodiments should be considered in a descriptive sense only and not for purposes of limitation. Descriptions of features or aspects within each embodiment should typically be considered as available for other similar features or aspects in the remaining embodiments.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. An image processing apparatus comprising:
a first calculator to generate a shadow map with respect to each of plural sampling virtual light sources that are provided on a three dimensional (3D) model, at a first viewpoint;
a selector to select, from the plurality of sampling virtual light sources, at least one seed virtual light source for image rendering, based on the at least one seed virtual light source being determined to be exposed at a second viewpoint respectively using the shadow maps of the sampling virtual light sources; and
a second calculator to add a respective plurality of super sampling virtual light sources to the 3D model around the selected at least one seed virtual light source for exposure at the second viewpoint, and to generate a shadow map with respect to each of the added super sampling virtual light sources for the image rendering.

2. The image processing apparatus of claim 1, further comprising:
a rendering unit to render an image observed at the second viewpoint, based on a shadow map of the selected at least one seed virtual light source and the shadow maps of the super sampling virtual light sources.

3. The image processing apparatus of claim 2, further comprising:
a third calculator to provide at least one auxiliary virtual light source on the 3D model observed at the second viewpoint, and to generate a shadow map with respect to each of the at least one auxiliary virtual light source,
wherein the rendering unit renders the image observed at the second viewpoint based on the shadow map of the selected at least one seed virtual light source, the shadow maps of the super sampling virtual light sources, and the shadow map of the at least one auxiliary virtual light source.

4. The image processing apparatus of claim 3, wherein the at least one auxiliary virtual light source is provided in a portion exposed at the second viewpoint of the object of the 3D model, and wherein the at least one auxiliary virtual light source is provided in the portion exposed at the second viewpoint so as to represent natural phenomena including one or more of light reflected at least twice, light scattering, and light diffraction.

5. The image processing apparatus of claim 2, wherein the rendering unit renders the image using a radiosity scheme.

6. The image processing apparatus of claim 1, wherein the first viewpoint corresponds to a light view location within the 3D model.

7. An image processing apparatus comprising:
a first calculator to generate a shadow map with respect to each of plural sampling virtual light sources that are provided on a 3D model, at a first viewpoint;
a rendering unit to render an image observed at a second viewpoint with respect to the 3D model, based on the shadow maps of the sampling virtual light sources;
a selector to select, from the plurality of sampling virtual light sources, at least one seed virtual light source for image rendering, based on the at least one seed virtual light source being determined to be exposed at the second viewpoint; and
a second calculator to add a respective plurality of super sampling virtual light sources respectively to the 3D model around the selected at least one seed virtual light source for exposure at the second viewpoint, and to generate a shadow map with respect to each of the added super sampling virtual light sources,
wherein the rendering unit updates the image through another rendering based on a shadow map of the selected at least one seed virtual light source and the shadow maps of the super sampling virtual light sources.

8. The image processing apparatus of claim 7, further comprising:
a third calculator to provide at least one auxiliary virtual light source on the 3D model observed at the second viewpoint, and to generate a shadow map with respect to each of the at least one auxiliary virtual light source,
wherein the rendering unit updates the image based on the shadow map of the selected at least one seed virtual light source, the shadow maps of the super sampling virtual light sources, and the shadow map of the at least one auxiliary virtual light source.

9. The image processing apparatus of claim 8, wherein the at least one auxiliary virtual light source is provided in a portion exposed at the second viewpoint of the object of the 3D model, and wherein the at least one auxiliary virtual light source is provide in the portion exposed at the second viewpoint so as to represent natural phenomena including one or more of light reflected at least twice, light scattering, and light diffraction.

10. The image processing apparatus of claim 7, wherein the rendering unit renders the image using a radiosity scheme.

11. The image processing apparatus of claim 7, wherein the first viewpoint corresponds to a light view location within the 3D model.

12. An image processing method, comprising:
generating a shadow map with respect to each of plural sampling virtual light sources that are provided on a 3D model, at a first viewpoint;
selecting, from the plurality of sampling virtual light sources, at least one seed virtual light source for image rendering, based on the at least one seed virtual light source being determined to be exposed at a second viewpoint respectively using the shadow maps of the sampling virtual light sources;
adding a respective plurality of super sampling virtual light sources to the 3D model around the selected at least one seed virtual light source for exposure at the second viewpoint; and
generating a shadow map with respect to each of the added super sampling virtual light sources for the image rendering.

13. The image processing method of claim 12, further comprising:
rendering an image observed at the second viewpoint, based on a shadow map of the selected at least one seed virtual light source and the shadow maps of the super sampling virtual light sources.

14. The image processing method of claim 13, further comprising:
providing at least one auxiliary virtual light source on the 3D model observed at the second viewpoint to generate a shadow map with respect to each of the at least one auxiliary virtual light source, wherein the rendering comprises rendering the image observed at the second viewpoint based on the shadow map of the selected at least one seed virtual light source, the shadow maps of the super sampling virtual light sources, and the shadow map of the at least one virtual light source.

15. The image processing method of claim 13, wherein the rendering is performed using a radiosity scheme.

16. An image processing method comprising:
    generating a shadow map with respect to each of plural sampling virtual light sources that are provided on a 3D model, at a first viewpoint;
    rendering first image observed at a second viewpoint with respect to the 3D model, based on the shadow maps of the plural sampling virtual light sources;
    selecting, from the plurality of sampling virtual light sources, at least one seed virtual light source for image rendering, based on the at least one seed virtual light source being determined to be exposed at the second viewpoint;
    adding a respective plurality of super sampling virtual light sources to the 3D model around the selected at least one seed virtual light source for exposure at the second viewpoint;
    generating a shadow map with respect to each of the added super sampling virtual light sources; and
    updating the first image through another rendering based on a shadow map of the selected at least one seed virtual light source and the shadow maps of the super sampling virtual light sources.

17. The image processing method of claim 16, further comprising:
    providing at least one auxiliary virtual light source on the 3D model observed at the second viewpoint to generate a shadow map with respect to each of the at least one auxiliary virtual light source; and
    updating the image based on the shadow map of the selected at least one seed virtual light source, the shadow maps of the super sampling virtual light sources, and the shadow map of the at least one auxiliary virtual light source.

18. The image processing method of claim 16, wherein the first viewpoint corresponds to a light view location within the 3D model.

19. A non-transitory computer-readable recording medium comprising computer readable code to control at least one processing device to implement an image processing method comprising:
    generating a shadow map with respect to each of plural sampling virtual light sources that are provided on a 3D model, at a first viewpoint;
    selecting, from the plurality of sampling virtual light sources at least one seed virtual light source for image rendering, based on the at least one seed virtual light source being determined to be exposed at a second viewpoint respectively using the shadow maps of the sampling virtual light sources;
    adding a respective plurality of super sampling virtual light sources to the 3D model around the selected at least one seed virtual light source for exposure at the second viewpoint; and
    generating a shadow map with respect to each of the added super sampling virtual light sources for the image rendering.

20. The image processing apparatus of claim 1, wherein the second calculator adds respective plurality of super sampling virtual light sources to the 3D model around a corresponding at least one seed virtual light source after the corresponding at least one seed virtual light source is selected by the selector.

21. The image processing apparatus of claim 1, wherein the sampling virtual light sources and the super-sampling virtual light sources represent at least respective sources of reflected light from the 3D model.

22. The image processing apparatus of claim 7, wherein the second calculator adds respective plurality of super sampling virtual light sources to the 3D model around a corresponding at least one seed virtual light source after the corresponding at least one seed virtual light source is selected by the selector.

23. The image processing apparatus of claim 7, wherein the sampling virtual light sources and the super-sampling virtual light sources represent at least respective sources of reflected light from the 3D model.

24. The image processing method of claim 12, wherein the adding of the respective plurality of super sampling virtual light sources to the 3D model includes adding respective plurality of super sampling virtual light sources around a corresponding at least one seed virtual light source after a selecting of the corresponding at least one seed virtual light source in the selecting of the at least one seed virtual light source.

25. The image processing method of claim 12, wherein the sampling virtual light sources and the super-sampling virtual light sources represent at least respective sources of reflected light from the 3D model.

26. The image processing method of claim 16, wherein the adding of the respective plurality of super sampling virtual light sources to the 3D model includes adding respective plurality of super sampling virtual light sources around a corresponding at least one seed virtual light source after a selecting of the corresponding at least one seed virtual light source in the selecting of the at least one seed virtual light source.

27. The image processing method of claim 16, wherein the sampling virtual light sources and the super-sampling virtual light sources represent respective at least sources of reflected light from the 3D model.

28. The image processing method of claim 16, wherein the rendering is performed using a radiosity scheme.

29. The non-transitory computer-readable recording medium of claim 19, wherein the adding of the respective plurality of super sampling virtual light sources to the 3D model includes adding respective plurality of super sampling virtual light sources around a corresponding at least one seed virtual light source after a selecting of the corresponding at least one seed virtual light source in the selecting of the at least one seed virtual light source.

30. The non-transitory computer-readable recording medium of claim 19, wherein the sampling virtual light sources and the super-sampling virtual light sources represent at least respective sources of reflected light from the 3D model.

31. The non-transitory computer-readable recording medium of claim 19, wherein the rendering is performed using a radiosity scheme.

32. An image processing apparatus comprising:
    a first calculator to generate a shadow map with respect to each of plural sampling virtual light sources that are provided on a three dimensional (3D) model to represent respective sources of reflected light from the 3D model, at a first viewpoint;

a selector to select, from the plurality of sampling virtual light sources, at least one seed virtual light source based on the at least one seed virtual light source being determined to be exposed at a second viewpoint respectively using the shadow maps of the sampling virtual light sources; and a second calculator to provide a plurality of super sampling virtual light sources, distinct from the plural sampling virtual light sources, respectively to the 3D model around the selected at least one seed virtual light source, and to generate a shadow map with respect to each of the added super sampling virtual light sources.

33. The image processing apparatus of claim 32, further comprising:

a rendering unit to render an image observed at the second viewpoint, based on a shadow map of the selected at least one seed virtual light source and the shadow maps of the super sampling virtual light sources, using a radiosity scheme.

34. An image processing apparatus comprising:

a first calculator to generate a shadow map with respect to each of plural sampling virtual light sources that are provided on a 3D model to represent respective sources of reflected light from the 3D model, at a first viewpoint;

a rendering unit to render an image observed at a second viewpoint with respect to the 3D model, based on the shadow maps of the sampling virtual light sources;

a selector to select, from the plurality of sampling virtual light sources, at least one seed virtual light source that is determined to be exposed at the second viewpoint for image rendering;

a second calculator to provide a plurality of super sampling virtual light sources, distinct from the plural sampling virtual light sources, respectively to the 3D model around the selected at least one seed virtual light source; and generating a shadow map with respect to each of the added super sampling virtual light sources, wherein the rendering unit updates the image by another rendering based on a shadow map of the selected at least one seed virtual light source and the shadow maps of the super sampling virtual light sources.

35. The image processing apparatus of claim 33, wherein the rendering unit renders the image using a radiosity scheme.

* * * * *

UNITED STATES PATENT AND TRADEMARK OFFICE
CERTIFICATE OF CORRECTION

| | |
|---|---|
| PATENT NO. | : 8,717,358 B2 |
| APPLICATION NO. | : 12/805454 |
| DATED | : May 6, 2014 |
| INVENTOR(S) | : In Woo Ha et al. |

Page 1 of 1

It is certified that error appears in the above-identified patent and that said Letters Patent is hereby corrected as shown below:

In the Claims

Column 11, Line 56, In Claim 19, delete "at" and insert -- , at --, therefor.

Signed and Sealed this
Twenty-eighth Day of October, 2014

Michelle K. Lee
*Deputy Director of the United States Patent and Trademark Office*